(12) United States Patent
Kishizoe

(10) Patent No.: US 8,347,930 B2
(45) Date of Patent: Jan. 8, 2013

(54) PNEUMATIC TIRE HAVING INNER LINER LAYER END PORTION IN RECESSED PORTION

(75) Inventor: Isamu Kishizoe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 502 days.

(21) Appl. No.: 12/642,069

(22) Filed: Dec. 18, 2009

(65) Prior Publication Data

US 2010/0154960 A1    Jun. 24, 2010

(30) Foreign Application Priority Data

Dec. 22, 2008 (JP) ................. 2008-325887
Oct. 16, 2009 (JP) ................. 2009-239777

(51) Int. Cl.
*B60C 5/14* (2006.01)
*B60C 13/02* (2006.01)
*B60C 15/00* (2006.01)

(52) U.S. Cl. ............ 152/510; 152/523; 152/539
(58) Field of Classification Search ............ 152/510, 152/539, 523
See application file for complete search history.

(56) References Cited

U.S. PATENT DOCUMENTS 3,414,036 A * 12/1968 Skidmore
2007/0131326 A1 * 6/2007 Yukawa et al.

FOREIGN PATENT DOCUMENTS

| JP | 2002-283808 A | | 10/2002 |
| JP | 2003200448 A | * | 7/2003 |
| JP | 2006035488 A | * | 2/2006 |
| WO | WO-2005/007423 A1 | | 1/2005 |

OTHER PUBLICATIONS

English machine translation of JP 2003-200448 A, Jul. 15, 2003.*
English machine translation of JP 2006-35488 A, Feb. 9, 2006.*

* cited by examiner

*Primary Examiner* — Adrienne C Johnstone
(74) *Attorney, Agent, or Firm* — Connolly Bove Lodge & Hutz LLP

(57) ABSTRACT

Provided are a pneumatic tire and a manufacturing method of the same capable of improving a separation failure at end portions of an inner liner layer made of either a thermoplastic resin or a thermoplastic elastomer composition. The pneumatic tire includes an inner liner layer made of either a thermoplastic resin or a thermoplastic elastomer composition obtained by blending a thermoplastic resin component and an elastomer component. The inner liner layer is provided on an inner side of the tire so as to face a tire cavity. A recessed portion is formed in an internal surface area of the tire where an end portion of the inner liner layer is located.

7 Claims, 3 Drawing Sheets

PNEUMATIC TIRE HAVING INNER LINER LAYER END PORTION IN RECESSED PORTION

CROSS REFERENCE TO RELATED APPLICATIONS

This application claims priority to JP2008-325887 filed Dec. 22, 2008 and JP2009-239777 filed Oct. 16, 2009, the entire contents of all are hereby incorporated by reference.

TECHNICAL FIELD

The present invention relates to a pneumatic tire and a manufacturing method of the same. More specifically, the present invention relates to a pneumatic tire and a manufacturing method of the same capable of improving separation failure at end portions of an inner liner layer made of either a thermoplastic resin or a thermoplastic elastomer composition.

BACKGROUND ART

In a conventionally known pneumatic tire, a film that is made of either a thermoplastic resin or a thermoplastic elastomer composition produced by blending a thermoplastic resin component and an elastomer component is used as an inner liner layer (see, for example, Patent Documents 1 and 2). The use of such a film has an advantage of making the inner liner layer lighter in weight and of improving the fuel economy.

A film-like inner liner layer made of either a thermoplastic resin or a thermoplastic elastomer composition, however, has a higher elastic modulus than an inner liner layer made of rubber. For this reason, such an elastic inner liner layer is likely to be separated at its end portions. Therefore, it has been strongly demanded to take measures against this problem.

Citation List

Patent Literature 1
WO2005/007423
Patent Literature 2
Japanese patent application Kokai publication No. 2002-283808

SUMMARY OF THE INVENTION

Technical Problem

An object of the present invention is to provide a pneumatic tire and a pneumatic tire manufacturing method capable of improving separation failure at end portions of an inner liner layer made of either a thermoplastic resin or a thermoplastic elastomer composition.

Solution to Problem

A pneumatic tire of the present invention to achieve the object is a pneumatic tire in which an inner liner layer made of any one of a thermoplastic resin and a thermoplastic elastomer composition produced by blending a thermoplastic resin component with an elastomer component is disposed on an inner side of the tire so as to face a tire cavity, wherein the pneumatic tire is characterized in that a recessed portion is formed in an internal surface area of the tire where an end portion of the inner liner layer is located.

A method of manufacturing a pneumatic tire of the present invention is a method of manufacturing the above-mentioned pneumatic tire in which an inner liner layer made of any one of a thermoplastic resin and a thermoplastic elastomer composition produced by blending a thermoplastic resin component with an elastomer component is disposed on an inner side of the tire so as to face a tire cavity, and in which a recessed portion is formed in an internal surface area of the tire where an end portion of the inner liner layer is located, and wherein the method is characterized in that while a green tire is being cured, a bladder having a raised portion which is formed on an external surface of the bladder so as to form the recessed portion is pressed onto an internal surface of the green tire.

Advantageous Effects of Invention

The present invention described above has the recessed portions that allow the end portions of the inner liner layer to be tucked into and cut into the tire. Accordingly, each of the end portions of the inner liner layer can be bonded and fixed to the adjacent member more firmly than in the conventional cases. Thus, it is possible to suppress separation at the end portions of the inner liner layer, and to improve separation failure at the end portions.

DESCRIPTION OF EMBODIMENTS

Hereinafter, an embodiment of the present invention will be described in detail by referring to the accompanying drawings.

Figure 1:
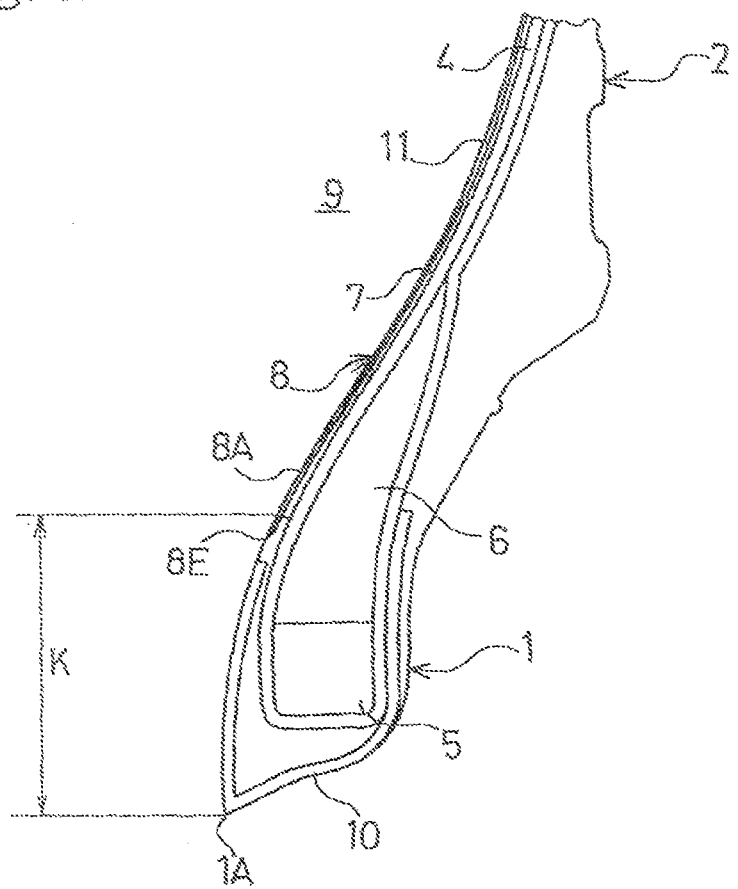
FIG. 1 is a sectional diagram illustrating a part of a pneumatic tire according to an embodiment of the present invention.

FIG. 1 illustrates a principal portion of a pneumatic tire according to the present invention. In FIG. 1, reference numeral 1 denotes a bead portion, and reference numeral 2 denotes a sidewall portion. A carcass layer 4 extends between the right and left bead portions 1. In the carcass layer 4, reinforcing cords extending in the radial direction of the tire are arranged in the circumferential direction of the tire at predetermined intervals and are embedded in a rubber layer. Each of the two end portions of the carcass layer 4 is folded back from the inner side in the axis direction of the tire to the outer side. The carcass layer 4 thus folded is wrapped around a bead core 5 buried in the bead portion 1 and sandwiches a bead filler 6.

Though not illustrated, in the tread portion, plural belt layers are provided on the outer circumferential side of the carcass layer 4. An inner liner layer 8 is provided on the inner circumferential side of the carcass layer 4 with a tie rubber layer 7 interposed therebetween. The inner liner layer 8 is a film-like layer made of either a thermoplastic resin or a thermoplastic elastomer composition produced by blending a thermoplastic resin component and an elastomer component. The inner liner layer 8, provided on the inner side of the tire to face a tire cavity 9, extends to the right and left bead portions 1. Reference numeral 10 is a reinforcing layer provided in the portion 1.

As shown in FIG. 2, plural recessed portions 12 are formed in an internal surface 11 of the tire. Each recessed portion 12 is not very deep. An area 11A where the plural recessed portions 12 are formed is the position where an end portion 8A of the inner liner layer 8 is located. The plural recessed portions 12 each having an rectangular shape are arranged in the inner-surface area 11A at predetermined intervals in a tire circumferential direction TC. Such a structure allows the end portion 8A of the inner liner layer 8 to be partially tucked into and cut into the tire at the predetermined intervals. Thus, the end portion 8A is bonded and fixed to the adjacent tie rubber layer 7 more firmly than in the conventional cases, so as to be prevented from being separated.

A depth d of the recessed portions 12 is preferably within a range from 0.2 to 1.0 mm. If each recessed portion 12 has a depth d that is smaller than 0.2 mm, the end portion 8A cannot effectively cut into the internal surface 11 of the tire. This makes it difficult to obtain the desired effect of separation improvement of the end portion 8A. In contrast, a depth d that is larger than 1.0 mm causes failures to occur. An example of such failures is cracks formed in some parts of the end portions 8A of the inner liner layer 8. The above-mentioned parts of the end portions 8A are the thinner parts formed by tucking the parts into the internal surface 11 of the tire during the vulcanization of the tire in the mold. A more preferable depth d ranges from 0.3 to 0.5 mm.

To effectively improve separation at the end portions 8A, it is preferable that each recessed portion 12 be formed to extend outwards in the tire radial direction to a position located at least 2 mm beyond a terminal end 8E of each end portion 8A of the inner liner layer 8. The outermost position of each recessed portion 12 is preferably located within a 30-mm range outwards from the terminal end 8E in the tire radial direction, or more preferably located within a 10-mm range from the terminal end 8E in the tire radial direction. This is because, in view of the durability of the product tire, the end portion of each recessed portion 12 should not be too close to the tire side portion that is deformed largely. Note that the above-mentioned lengths are measured along the tire radial direction.

Figure 2A:
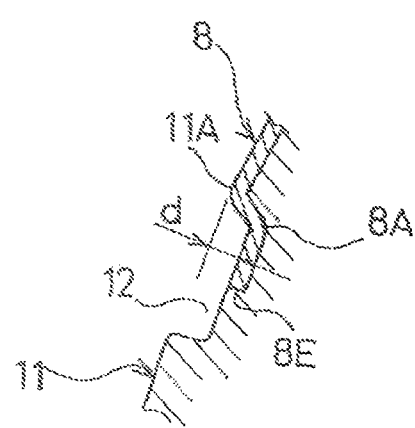
FIG. 2A is an enlarged sectional diagram illustrating a recessed portion.
Figure 2B:
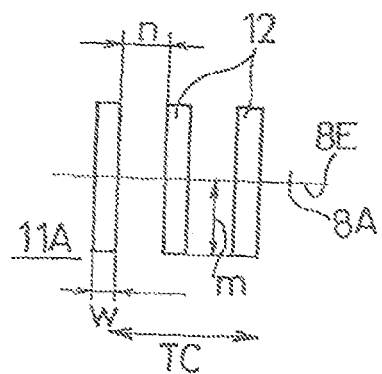
FIG. 2B is a diagram for describing an arrangement of recessed portions.

As shown in FIGS. 2A and 2B, it is preferable in view of the effect of the separation improvement that each recessed portion 12 extend outwards from a position located at the inner side, in the tire radial direction, of the terminal end 8E, beyond the terminal end 8E, to a position located at the outer side, in the tire radial direction, of the terminal end 8E. Alternatively, each recessed portion 12 may extend outwards in the tire radial direction from the terminal end 8E, within the above-mentioned ranges. As shown in FIGS. 2A and 2B, if each recessed portion 12 is formed from a position located at the inner side, in the tire radial direction, of the terminal end 8E, a length m from the terminal end SE to the inner-side end, in the tire radial direction, of the recessed portion 12 measured along the tire radial direction has to be at least 2 mm. It is possible to extend each recessed portion 12 until the inner-side end, in the tire radial direction, of the recessed portion 12 reaches as far as a bead toe.

As shown in FIGS. 2A and 2B, it is preferable in view of the effect of the separation improvement that each recessed portion 12 extend outwards from a position located at the inner side, in the tire radial direction, of the terminal end 8E, beyond the terminal end 8E, to a position located at the outer side, in the tire radial direction, of the terminal end 8E. Alternatively, each recessed portion 12 may extend outwards in the tire radial direction from the terminal end 8E, within the above-mentioned ranges. As shown in FIGS. 2A and 2B, if each recessed portion 12 is formed from a position located at the inner side, in the tire radial direction, of the terminal end 8E, a length m from the terminal end SE to the inner-side end, in the tire radial direction, of the recessed portion 12 measured along the tire radial direction has to be at least 2 mm. It is possible to extend each recessed portion 12 until the inner-side end, in the tire radial direction, of the recessed portion 12 reaches as far as a bead toe.

A width w, measured along the tire circumferential direction, of each recessed portion 12 is preferably within a range from 1.0 mm to 10.0 mm. If the width w is narrower than 10 mm, the end portion 8A cannot effectively cut into the internal surface 11 of the tire. This makes it difficult to obtain the desired effect of separation improvement of the end portion 8A. In contrast, a width w that is larger than 10.0 mm causes failures (e.g., separation of the inner liner layer 8) to occur at the recessed portion 12.

A distance n between every two adjacent recessed portions 12 is preferably within a range from 3 to 20 mm. If the distance n is narrower than 3 mm, too many recessed portions 12 are formed. This impairs the resistance against air permeation of the inner liner layer 8 and also impairs the durability of the product tire. In other words, some parts of the end portions 8A of the inner liner layer 8 face the recessed portions 12, and these parts are formed to be thinner than the other parts by tucking the parts into the internal surface 11 of the tire during the vulcanization of the tire in the mold. These thinner parts are less resistant against air permeation. If such thinner parts are formed numerously, the inner liner layer 8 as a whole becomes less resistant against air permeation and the durability of the tire is negatively affected. Conversely, if the distance n is wider than 20 mm, the distance is too wide to effectively improve the separation at the end portion 8A.

Figure 3:
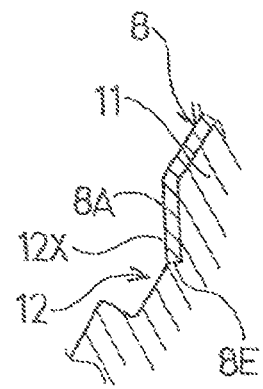
FIG. 3 is an enlarged sectional diagram illustrating a preferable example of the recessed portions.

In each of the recessed portions 12, it is preferable, as shown in FIG. 3, that each recessed portion 12 have a part 12X in which the end portion 8A is located and which is formed so as to be gradually deeper from the internal surface 11 of the tire inwards in the tire radial direction. This is because the bending part of the end portion 8A becomes smoother and thus enhances the durability of the tire.

As to the position of the terminal end 8E of the inner liner layer 8 that extends between the right and the left bead portions 1, it is preferable that a distance k measured from a bead toe 1A along the tire radial direction to the terminal end 8E be within a range from 5 to 30 mm. A shorter distance k than 5 mm (i.e., a longer inner liner layer 8) causes wrinkles to be more likely to occur in the end portion 8A of the inner liner layer 8 when the tire is formed using a making drum. The wrinkles are a possible cause of air pockets. In contrast, a longer distance k than 30 mm increases the amount of air leakage from the portions that are not covered by the inner liner layer 8. This is also an undesirable result.

Figure 4:
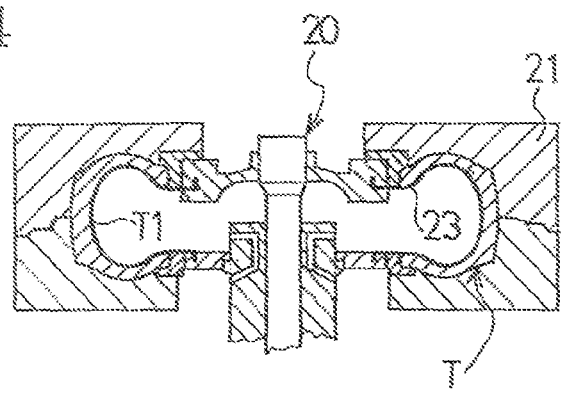
FIG. 4 is a sectional diagram for describing a vulcanization process performed by a pneumatic tire manufacturing method according to the present invention.
Figure 5:
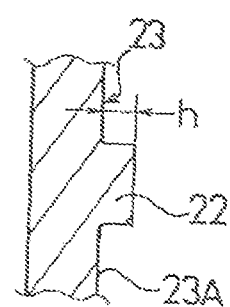
FIG. 5 is an enlarged sectional diagram illustrating a principal portion of a bladder in which raised portions are formed.

The above-described pneumatic tire can be manufactured in the following manner. Firstly, a green tire T with a structure illustrated in FIG. 1 is formed. Then, as shown in FIG. 4, the green tire T is vulcanized in a mold 21 of a vulcanizer 20. While the green tire T is vulcanized, the green tire T is pressurized from the inner side using a bladder 23. The bladder 23 used during this vulcanization and molding process has a barrel shape. As shown in FIG. 5, raised portions 22 to form the above-described recessed portions 12 are formed on the outer surface 23A of the bladder 23. The raised portions 22 are arranged in the bladder circumferential direction at predetermined intervals. The bladder 23 is inflated by supplying a heating-and-pressurizing medium to the inside of the bladder 23. The bladder 23 thus inflated is pressed onto an internal surface T1 of the green tire T while the green tire T is being cured. The recessed portions 12 are formed respectively by the raised portions 22. In this event, the portions of the end portion 8A of the inner liner layer 8 that correspond respectively to the recessed portions 12 are tucked inwards by their respective raised portions 22. The portions thus tucked in cut into the tie rubber layer 7 while the green tire T is being cured. Accordingly, the end portion 8A is bonded and fixed to the tie rubber layer 7 more firmly than in conventional cases, so as to suppress separation at the end portions 8A.

A height h of each raised portion 22 is preferably within a range from 0.2 to 1.0 mm while the bladder 23 is pressed onto the internal surface T1 of the green tire T. It is preferable that each raised portion 22 be formed to extend outwards in the radial direction of the bladder 23 to a position located at least 2 mm beyond the position corresponding to the terminal end 8E of the end portion 8A of the inner liner layer 8, when the bladder 23 is pressed onto the internal surface T1 of the green tire T. The width of each raised portion 22, measured along the circumferential direction of the bladder 23, is preferably within a range from 1.0 to 10.0 mm, when the bladder 23 is pressed onto the internal surface T1 of the green tire T.

The distance between every two adjacent raised portions 22 is preferably within a range from 3 to 20 mm, when the bladder 23 is pressed onto the internal surface T1 of the green tire T. The height of each raised portion 22 is gradually increasing from an external surface 23A towards the inner side in the radial direction of the bladder 23, when the bladder 23 is pressed onto the internal surface T1 of the green tire T.

Figure 6:
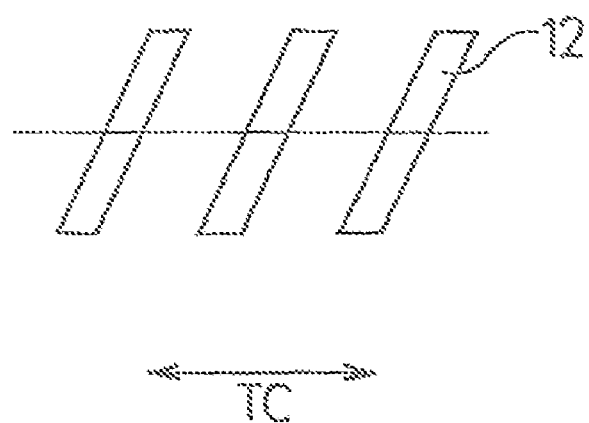
FIG. 6 is a diagram for describing another example of recessed portions.
Figure 7:
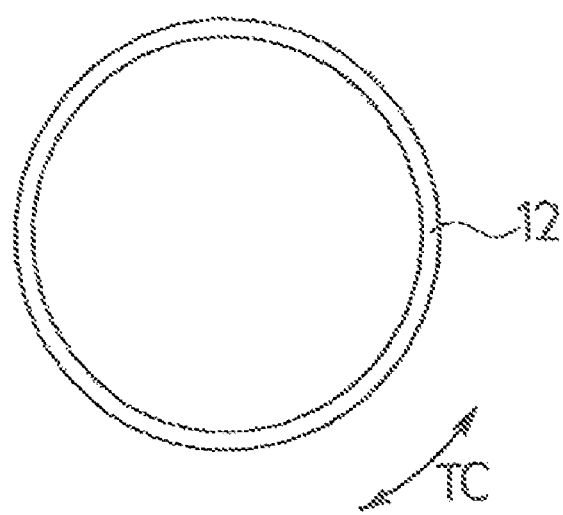
FIG. 7 is a diagram for describing still another example of recessed portions.

In the present invention, as shown in FIG. 6, the recessed portions 12 may be formed to obliquely extend relative to the tire radial direction, which is a direction orthogonal to the tire circumferential direction TC. Alternatively, the recessed portions 12 may be formed to have a ring shape along the end portion 8A of the inner liner layer 8 so as to extend in the tire circumferential direction either with or without periodical breaks, as shown in FIG. 7. Still alternatively, each recessed portion 12 may have a trapezoidal shape, a semispherical shape, or other shapes. The shape of each recessed portion 12 is not limited to a particular one as long as the above-described effect can be obtained. Nevertheless, it is preferable that each recessed portion 12 extend along the tire radial direction as shown in FIG. 2. This is because the recessed portions 12 each having the above-described shape allow the end portion 8A to cut into the internal surface 11 of the tire more effectively.

It is preferable that the thermoplastic resin and the thermoplastic elastomer composition either of which the inner liner layer 8 is made of have a modulus of elasticity ranging from 1 to 500 MPa and a coefficient of air permeability equal to $25 \times 10^{-12}$ cc·cm/cm$^2$·sec·cmHg or smaller. A lower modulus of elasticity than 1 MPa causes wrinkles to be formed when the green tire is formed, worsening the forming processability. Conversely, a modulus of elasticity exceeding 500 MPa causes a problem in the durability. A coefficient of air permeability exceeding $25 \times 10^{-12}$ cc·cm/cm$^2$·sec·cmHg requires an increase in the thickness of the inner liner layer 8 for the purpose of maintaining the internal pressure. The thicker inner liner layer 8 is not favorable if the tire has to be as light in weight as possible.

In the present invention, examples of the thermoplastic resin for use in the inner liner layer 8 include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); polymethacrylate resins (for example, polymethyl methacrylate (PMMA), polyethyl methacrylate); polyvinyl resins (for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene (ETFE) copolymers); and imide resins (for example, aromatic polyimide (PI)).

The thermoplastic elastomer composition may be produced by blending a thermoplastic resin component and an elastomer component. Favorable examples of the elastomer for use include: diene rubbers and their hydrogenated products (for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR); olefin rubbers (for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isobutylene-p-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, ester elastomers, urethane elastomers, and polyamide elastomers).

If a particular thermoplastic resin among those described above is incompatible with such an elastomer, a compatibilizer may be used as a third component appropriately to make the two compatible with each other. Mixing such a compatibilizer into the blend system of the thermoplastic resin and the elastomer component reduces the interfacial tension between the thermoplastic resin and the elastomer component. As a result, the rubber particles constituting the dispersion layer is made finer, so that both components can exhibit their characteristics more effectively. In general, such a compatibilizer has a copolymer structure of at least one of the thermoplastic resin and the elastomer component, or a copolymer structure having an epoxy group, a carbonyl group, a halogen group, an amino group, an oxazoline group, or a hydroxyl group, which is capable of reacting with the thermoplastic resin or the elastomer component. The compatibilizer can be selected depending on the types of the thermoplastic resin and the elastomer component to be mixed therewith. Examples of the compatibilizer normally used to this end include styrene/ethylene-butylene-styrene block copolymers (SEBS) and their maleic acid-modified products, EPDM, EPM, EPDM/styrene oxo EPDM/acrylonitrile graft copolymers and their maleic acid-modified products, styrene/maleic acid copolymers, reactive phenoxine, and the like. The blending proportion of such a compatibilizer is not particularly limited. The blending proportion of such a compatibilizer may preferably be 0.5 to 10 parts by weight relative to 100 parts by weight of the polymer components (the total amount of the thermoplastic resin and the elastomer component).

If a thermoplastic resin and an elastomer are blended together, the proportion of a particular thermoplastic resin component (A) to a particular elastomer component (B) is not limited to a particular proportion. Rather, it is possible to determine the proportion by taking account of the balance among the thickness of the film, the resistance against air permeation, and the flexibility. A preferable proportion by weight (A)/(B) ranges from 10/90 to 90/10. A more preferable proportion (A)/(B) ranges from 15/85 to 90/10.

Besides the above-mentioned essential polymer components, other polymers may be mixed with the thermoplastic elastomer composition according to the present invention. If such other polymers are mixed, care has to be taken not to impair the necessary properties of the thermoplastic elastomer composition for the tire of the present invention. The above-mentioned compatibilizer polymer is an example of such other polymers. The purposes of mixing such a polymer are to improve the compatibility between the thermoplastic resin and the elastomer, to improve the molding processability of the material for the film, to improve the heat resistance, to reduce cost, and so on. Examples of the material used for the polymer include polyethylene (PE), polypropylene (PP), polystyrene (PS), ABS, SBS, and polycarbonate (PC). In addition, a filler (calcium carbonate, titanium oxide, alumina, or the like) generally blended with a polymer blend, a reinforcement such as carbon black and white carbon, a softener, a plasticizer, a processing aid, a pigment, a dye, an anti-degradant, or the like can be blended optionally with the inner liner layer as long as such an agent does not harm the characteristic required as the band member 3.

When mixed with the thermoplastic resin, the aforementioned elastomer component can be dynamically vulcanized. When the aforementioned elastomer component is dynamically vulcanized, a vulcanizer, a vulcanization assistant, vulcanization conditions (temperature and time), and the like, can be determined as appropriate in accordance with the composition of the elastomer component to be added, and are not particularly limited.

As the vulcanizer, a generally-available rubber vulcanizer (crosslinking agent) can be used. Specifically, examples of a sulfur-based vulcanizer include a sulfur powder, precipitated sulfur, highly dispersible sulfur, surface-treated sulfur, non-soluble sulfur, dimorpholin disulfide, and alkylphenol disulfide. Such a vulcanizer can be used in an amount of, for example, approximately 0.5 to 4 phr. Herein, "phr" refers to parts by weight per 100 parts by weight of the rubber (polymer) component.

Examples of an organic peroxide-based vulcanizer include benzoil peroxide, t-butylhydro peroxide, 2,4-dichrolobenzoil peroxide, 2,5-dimethyl-2,5-di(t-butylperoxy)hexane, and 2,5-dimethylhexane-2,5-di(peroxyl benzoate). Such a vulcanizer can be used in an amount of, for example, approximately 1 to 20 phr.

Examples of a phenol resin-based vulcanizer include: a brominated alkylphenol resin; a mixed cross-linked system including a halogen donner such as tin chloride and chloroprene, and an alkylphenol resin. Such a vulcanizer can be used in an amount of, for example, approximately 1 to 20 phr. Other examples include zinc white (approximately 5 phr), magnesium oxide (approximately 4 phr), lead oxide (approximately 10 to 20 phr), p-quinonedioxime (approximately 2 to 10 phr), p-dibenzoil quinonedioxime (approximately 2 to 10 phr), tetrachloro-p-benzoquin (approximately 2 to 10 phr), poly-p-dinitrosobenzene (approximately 2 to 10 phr), and methylenedianiline (approximately 0.2 to 10 phr).

As necessary, a vulcanization accelerator may be added. Examples of a vulcanization accelerator are aldehyde-ammonia-based, guanidine-based, thiazole-based, sulfenamide-based, thiuram-based, dithioic acid salt-based, and thiourea-based vulcanization accelerators which are generally available. The amount of the vulcanization accelerator used is for example, approximately 0.5 to 2 phr. Specifically, an example of the aldehyde-ammonia-based vulcanization accelerator is hexamethylenetetramine. An example of the guanidine-based vulcanization accelerator is diphenylguanidine. Some examples of the thiazole-based vulcanization accelerator include dibenzothiazyl disulfide (DM), 2-mercaptobenzothiazole and its Zn salt, and cyclohexylamine salt. Some examples of the sulfonamide-based vulcanization accelerator include cyclohexyl benzothiazyl sulfonamide (CBS), N-oxydiethylene benzothiazyl-2-sulfenamide, N-t-butyl-2-benzothiazol sulfonamide, and 2-(thymol polynyl dithio)benzothizole. Some examples of the thiuram-based vulcanization accelerator include tetramethyl thiuram disulfide (TMTD), tetraethyl tiuram disulfide, tetramethyl tiuram monosulfide (TMTM), and dipenthamethylene thiuram tetrasulfide. Some examples of the dithioic acid salt-based vulcanization accelerator include Zn-dimethyl dithiocarbamate, Zn-diethyl dithiocarbamate, Zn-di-n-buthyl dithiocarbamate, Zn-ethylphenyl dithiocarbamate, Te-diethyl dithiocarbamate, Cu-dimethyl dithiocarbamate, Fe-dimethyl dithiocarbamate, and pipecoline pipecolyl dithiocarbamate. Some examples of the thiourea-based vulcanization accelerator include ethylene thiourea and diethyl thiourea.

Additionally, a vulcanization accelerator assistant which is generally-used for a rubber can also be used. For some examples of the vulcanization accelerator assistant include: zinc white (approximately 5 phr); and stearic acid, oleic acid and their Zn salts (approximately 2 to 4 phr). The method for producing the thermoplastic elastomer composition is as follows. The thermoplastic resin component and the elastomer component (unvulcanized one in the case of rubber) are melt-kneaded in advance by a bi-axial kneader/extruder or the like. The elastomer component is dispersed as a dispersion phase (domain) in the thermoplastic resin forming a continuous phase (matrix). When the elastomer component is vulcanized, the vulcanizer can be added during the kneading process to dynamically vulcanize the elastomer component.

Although the various compounding agents (except for vulcanizer) may be added to the thermoplastic resin or the elastomer component during the kneading process, it is preferable to premix the compounding agents before the kneading process. The kneader used for kneading the thermoplastic resin and the elastomer component is not particularly limited. For example, a screw extruder, kneader, Banbury Mixer, bi-axial kneader/extruder, or the like can be used as the kneader. Among these, a bi-axial kneader/extruder is preferably used for kneading the thermoplastic resin and the elastomer component and for dynamically vulcanizing the elastomer component. Furthermore, two or more types of kneaders can be used to successively knead the thermoplastic resin and the elastomer component. As the condition for the melt kneading, the temperature should be at a temperature at which the thermoplastic resin melts or at a higher temperature. The shear rate at the time of kneading is preferably 1000 to 7500 $sec^{-1}$. The overall kneading time is 30 seconds to 10 minutes. When the vulcanizer is added, the vulcanization time after the addition is preferably 15 seconds to 5 minutes. The polymer composition produced by the above-described method may be formed into a cylinder shape by use of an ordinary cylinder-shaped film extruder in accordance with a predetermined method.

The thermoplastic elastomer composition thus obtained has a structure in which the elastomer component (B) is dispersed as a discontinuous phase in the matrix of the thermoplastic resin (A). By adopting such a structure, the thermoplastic elastomer composition can give sufficient flexibility to the film. Meanwhile, the effect that the resin layer has as the continuous phase can give sufficient rigidity to the film. Furthermore, it becomes possible to obtain, in molding, a molding processability equivalent to the case of a thermoplastic resin regardless of the amount of the elastomer component.

There are various ways of bonding the inner liner layer 8 to other adjacent tire component members. In an exemplar method, an adhesive agent is applied to the inner liner layer 8 and/or the counterpart member, and then the bonding is accomplished by the heat and the pressure applied while the tire is formed through vulcanization. The adhesive agent used for this purpose is obtained by solving a polymer and a cross-linking agent. Some examples of the polymer include an ordinary rubber-based polymer, a phenol resin-based polymer, an acrylic copolymer-based polymer, an isocyanate-based polymer. In an alternative method, a multi-layered laminate is fabricated by either extruding the cylindrical film together with an adhesive resin, and the multilayered laminate is bonded to the adjacent tire component member during the vulcanization process. Some examples of the adhesive resin include styrene butadiene styrene copolymer (SBS), ethylene ethyl acrylate (EEA), and styrene ethylene butylene block copolymer (SEBS). Some examples of solvent-based adhesive agent include a phenol resin-based adhesive agent (Chemlok® 220 manufactured by Lord Corporation), a chlorinated rubber-based adhesive agent (Chemlok® 205 and Chemlok® 234B), and an isocyanate-based adhesive agent (Chemlok® 402).

EXAMPLE 1

Tires of the present invention 1 to 5 (Examples 1 to 5) each of which had a configuration shown in FIG. 1 were fabricated in accordance with the following specifications. The tire size was 205/55R16. The inner liner layer having a 20-µm thickness was provided on the internal surface of each tire (the position of the terminal end of the inner liner layer was 15 mm away from the bead tow). The inner liner layers were made of a thermoplastic elastomer composition obtained by blending the raw materials listed in Table 1. Recessed portions were formed in an internal-surface area of each tire where the end portion of the inner liner layer was located. Conventional tires were also fabricated in accordance with the above-described specifications except that no recessed portion was formed (Conventional Example). One hundred tires were fabricated for each type of the Examples 1 to 5, and one hundred tires of Conventional Example were fabricated.

Listed in Table 2 are: the depth of each recessed portion; the distance between every two adjacent ones of the recessed portions that were arranged in the tire circumferential direction at predetermined intervals; the width of each recessed portion; the length of each recessed portion that extended from the terminal end of the inner liner layer outwards and inwards in the tire radial direction. Note that each of the tires of the present invention 1 to 5 has a constant depth.

Using the tires thus fabricated (100 tires of each type), the separation failure at the end portions of the inner liner layer was assessed. Table 2 shows the assessment results using index values with the results for the conventional tire being 100. The larger this index value is, the less likely the separation failures occur.

TABLE 1

| Blending Composition | Blending Proportion | Product Name | Manufacturer Name |
|---|---|---|---|
| Nylon 6/66 | 40 parts by weight | Alamin CM 6001 | Toray Industries, Inc. |
| Br-IPMS | 60 parts by weight | MDX90-10 | ExxonMobil Chemical Company |
| Zinc White | 1 part by weight | Zinc White III | Seido Chemical Industry Co., Ltd. |
| Stearic Acid | 1 part by weight | Beads Stearic Acid | NOF CORPORATION |

TABLE 2

| | | Conventional Example | Example 1 | Example 2 | Example 3 | Example 4 | Example 5 |
|---|---|---|---|---|---|---|---|
| Recessed Portion | Depth (mm) | — | 0.2 | 0.3 | 0.5 | 0.8 | 1.0 |
| | Distance (mm) | — | 10 | 1.0 | 10 | 1.0 | 10 |
| | Width (mm) | — | 5 | 5 | 5 | 5 | 5 |
| | Length (mm) | — | 2 | 2 | 2 | 2 | 2 |
| Separation Failure | | 100 | 107 | 111 | 113 | 110 | 107 |

Table 2 demonstrates that the tires of the present invention are capable of improving separation at the end portions of the inner liner layer.

What is claimed is:

1. A pneumatic tire in which an inner liner layer made of any one of a thermoplastic resin and a thermoplastic elastomer composition produced by blending a thermoplastic resin component with an elastomer component is disposed on an inner side of the tire, the inner side facing a tire cavity, wherein a plurality of recessed portions are formed in an internal surface area of the tire inner side where an end portion of the inner liner layer is located, the plurality of recessed portions being arranged in the tire circumferential direction at predetermined intervals, the end portion of the inner liner layer including a terminal end, and wherein the outermost position of each recessed portion is located within a 30 mm range outwards from the terminal end of the end portion of the inner liner layer in the tire radial direction.

2. The pneumatic tire according to claim 1, wherein each recessed portion has a depth ranging from 0.2 mm to 1.0 mm.

3. The pneumatic tire according to claim 1, wherein each of the recessed portions extends to a position at least 2 mm from the terminal end of the end portion of the inner liner layer outward in the tire radial direction.

4. The pneumatic tire according to claim 3, wherein each of the recessed portions has a width ranging from 1.0 mm to 10.0 mm when measured along the tire circumferential direction.

5. The pneumatic tire according to claim 3, wherein the recessed portions are arranged at 3 mm to 20 mm intervals.

6. The pneumatic tire according to claim 3, wherein each of the recessed portions becomes gradually deeper from the internal surface of the tire inner side in the tire radial direction.

7. The pneumatic tire according to claim 1, wherein the inner liner layer extends between right and left bead portions, and a length from a bead toe of each of the bead portions to the terminal end of the corresponding end portion of the inner liner layer ranges from 5 mm to 30 mm.

* * * * *